Nov. 28, 1967  
F. E. BROWN  
3,354,891  
PORTABLE CAMPER OF FABRIC ADAPTED FOR
MOUNTING TO A BOX OF A PICKUP TRUCK  
Filed Sept. 8, 1965
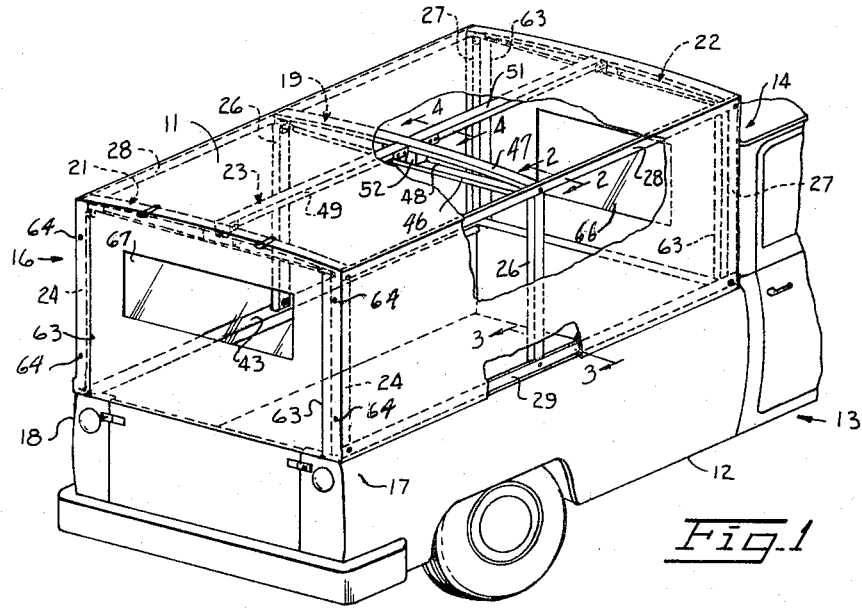
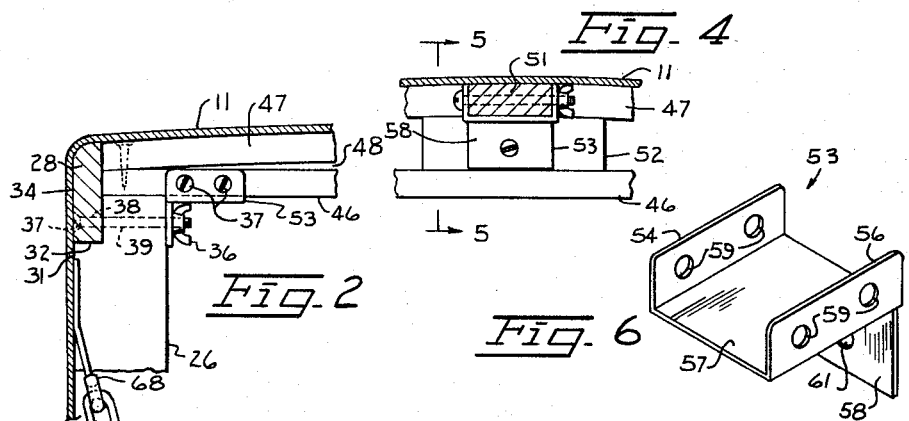
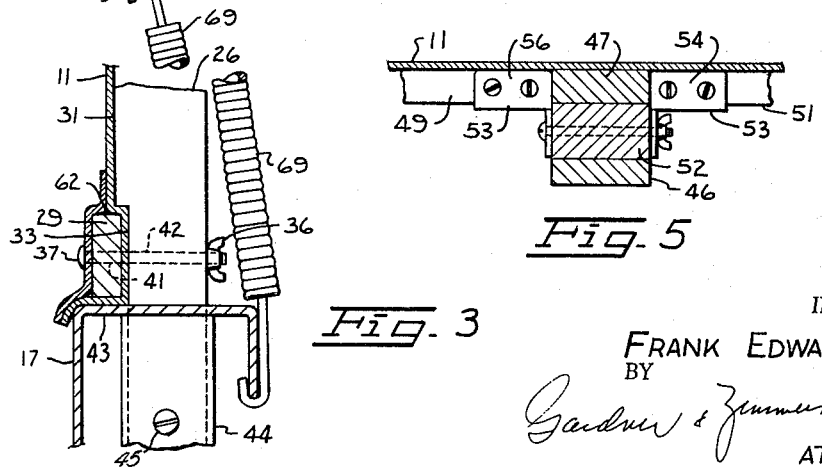
INVENTOR.  
FRANK EDWARD BROWN  
BY  
*Gardner & Zimmerman*  
ATTORNEYS United States Patent Office 3,354,891
Patented Nov. 28, 1967

3,354,891
PORTABLE CAMPER OF FABRIC ADAPTED FOR MOUNTING TO A BOX OF A PICKUP TRUCK
Frank Edward Brown, 4519 Walnut St., Oakland, Calif. 94619
Filed Sept. 8, 1965, Ser. No. 485,693
7 Claims. (Cl. 135—1)

ABSTRACT OF THE DISCLOSURE

This disclosure describes a camper which is adapted to be mounted over the box of a truck and which may be disassembled for storage when not in use on the truck. The camper comprises a wooden frame structure of struts and cross beams which are detachably secured together so that the frame can be disassembled, and a fabric covering detachably secured over the frame to enclose four sides and a top of the space defined by such frame.

---

The present invention relates generally to campers of the class which are fastened to an open-topped box of a pickup truck to provide a sheltered enclosure. More particularly, it relates to a portable camper of the above identified class which is constructed from fabric.

Campers adapted to be mounted to the box of a pickup truck are available in a variety of shapes and sizes. Generally, such campers are constructed from steel, aluminum and in some cases wood. In most cases, the campers are of unitary construction, varying in size from approximately 6' long x 4' wide x 4' high to 14' long x 8' wide x 8' high. Because of the unitary nature of their construction, the demounting of such campers is very cumbersome.

One of the principal attractions of the pickup truck-camper combination is the versatility associated therewith. With the camper mounted on the truck, living quarters are provided for recreation acitivities such as traveling, camping, hunting or the like. Of course with the camper removed, the pickup truck can be used for the conventional purposes for which it was intended, for example, hauling and the like. Now, when the camper is removed from the truck, it must be stored. With the unitary models of the campers, considerable space must be provided for their storage. The larger model campers require as much space as found in conventional home automobile garages. Although some campers may be disassembled, for example by uncoupling all of the sides from each other and the top, still a rather large area must be provided for the storage of the disassembled camper.

Considerable advantage is therefore to be gained by the provision of a portable, light weight, easily assembled and disassembled camper requiring very little storage space. The present invention is a camper which is characterized by the foregoing and thereby overcomes many of the limitations and disadvantages associated with the prior art pickup truck mounted camper units. More specifically, the camper of the present invention comprises a fabric covering, preferably treated to be waterproof, supported by a framework to the open-topped box of a pickup truck. The box and covering define an enclosure suitable, for example, to serve as living quarters. Entrance is gained therein by furnishing the camper with a suitable door. To render the entire camper portable, i.e., fabric covering and framework, the fabric covering is detachably mounted to the framework. In addition, the framework is constructed from a plurality of struts and detachable interconnecting cross-members, the struts being detachably secured to the box of the pickup truck. In its broken-down form, the fabic covering can conveniently be rolled into a bundle with the struts and cross-members of the framework contained therein, the bundle capable of being carried easily by a single individual and requiring very little space for storage.

Accordingly, it is the principal object of the present invention to provide a lightweight, portable pickup truck mounted camper.

More particularly, it is an object of the present invention to provide a pickup truck mounted camper which is easily disassembled for storage in a small space.

Another object of the present invention is to provide a pickup truck mounted camper featuring a fabric covering detachably mounted to a supporting framework.

It is still another object of the present invention to provide a camper supporting framework which is easily disassembled.

Yet a further object of the present invention is to provide a pickup truck mounted camper having fabric housing free of wind induced buffeting.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is an isometric drawing illustrating one embodiment of the portable camper of the present invention as mounted to the open-topped box of a pickup truck.

FIGURE 2 is a sectional view taken at lines 2—2 of FIGURE 1 illustrating the joint between a strut and a top crossbeam structure of the camper framework.

FIGURE 3 is a sectional view taken at lines 3—3 of FIGURE 1 illustrating the mounting of the camper box of the pickup truck.

FIGURE 4 is a sectional view taken at lines 4—4 of FIGURE 1 illustrating the joint between top crossbeams of the camper framework.

FIGURE 5 is a sectional view taken at lines 5—5 of FIGURE 4.

FIGURE 6 is an illustration of the unique bracket employed to join the various members of the framework of the camper.

With particular reference to FIGURE 1, it is seen that the portable camper of the present invention comprises a frame supported fabric covering 11 mounted to an open-topped box 12 of a pickup truck 13. The fabric covering 11 is arranged to define with said box 12 a shelter enclosure suitable, for example, to serve as living quarters. In order that the camper of the present invention be suitable as a shelter in wet as well as dry weather, it is preferable that the material composing fabric covering 11 be water resistant, for example, such as waterproofed canvas.

The mounting of fabric covering 11 to box 12 is accomplished by attaching it to a framework including first and second trestle-like members 14 and 16. Members 14 and 16 are detachably mounted respectively to opposite sides 17 and 18 of box 12. Improved top support for covering 11 is provided by detachably mounting between trestle-like members 14 and 16 spaced apart first, second and third crossbeam structures 19, 21 and 22 respectively, the first structure 19 flanked by structures 21 and 22 respectively. A crossbeam member 23 is joined between the outermost crossbeam structures 21 and 22.

In its preferred form trestle-like members 14 and 16 each respectively comprise three struts 24, 26 and 27 of rectangular cross section respectively vertically detachably mounted to the side 17 of box 12 at regularly spaced intervals. For maximum utilization of the space defined by box 12, struts 24 and 27 are mounted respectively at the front and rear ends of side 28 with strut 26 mounted at the midpoint therebetween. The trestle-like members are completed respectively by first and second horizontal support beams 28 and 29 of rectangular cross section detachably mounted to respective adjacent ends of the struts. It is to be noted that the support beams 28 and 29 may be supported by other strut arrangements, for example, inclined or crossed struts.

The particular manner of joining the struts and horizontal support beams of the trestle-like members 14 and 16 is detailed in FIGURES 2 and 3. As illustrated therein, strut 26 is cut at its respective ends along a side 31 thereof facing outward away from side 17 of box 12 to define upper and lower notches 32 and 33. The size of notch 32 is adjusted so that the horizontal support beam 28 positioned therein extends above strut 26 with its outer vertical surface 34 coextensive with surface 31 of strut 26. Although there are numerous means of securely fastening beam 28 to strut 26, for portability and ease of assembly and disassembly it has been found that conventional fasteners, such as a wing nut 36 and bolt 37 type, serve the purpose well. Hence, horizontal support beams 28 are provided with apertures 38 axially aligned with apertures 39 defined by the notched portions 32 of struts 24, 26 and 27 to receive therethrough bolts 37.

In fastening horizontal support beam 29 to strut 26, the size of notch 33 is adjusted so that beam 29 positioned therein extends approximately one-half its thickness beyond the surface 31 of strut 26. As will be set forth in more detail hereinafter, this manner of mounting beam 29 to the struts 24, 26 and 29 provides for superior mounting of the covering 11 to the supporting frame. Horizontal support beam 29 is secured to strut 26 by a wing nut 36 and bolt 37 fastened through axially aligned beam aperture 41 and strut aperture 42. The other struts 24 and 27 are fastened to horizonatl support beams 28 and 29 in a manner similar to that described immediately hereinabove.

The manner in which the framework supporting covering 11 is mounted to the open-topped box of a pickup truck will vary according to the particular design of the box of the pickup truck. For example, as portrayed in FIGURE 3, pickup truck 13 has an open-topped box 12 with a conventional folded upper edge 43 defining receptacles 44 spaced therealong. With such a box 12, the ends of struts 24, 26 and 27 to be mounted thereto are adapted for insertion into receptacles 44. A bolt 45 and wing nut (not shown) are provided passing laterally through each of the receptacles and the strut ends therein in order to secure the struts to the box 12.

To facilitate the drawing taut of covering 11 over the framework, crossbeam structures 19, 21 and 22 are constructed to present a convexly curved surface to covering 11. With a taut covering 11, wind induced buffeting and attendant noise and covering structural fatigue is minimized. Referring now to FIGURE 1 and in particular crossbeam structure 19, it is seen that structure 19 includes a lower crossbeam 46 of rectangular cross section horizontally detachably mounted between struts 26. A second upper crossbeam 47 of rectangular cross section is mounted vertically spaced above crossbeam 46 between trestle-like members 14 and 16 to define a space 48 therebetween. The crossbeam 47 is mounted to bend concavely away from crossbeam 46. Although the other crossbeam structures 21 and 22 can be similarly constructed, a crossbeam such as the curved crossbeam 47 would be sufficient. However, since the center crossbeam structure 19 must support most of the weight of the top portion of covering 11 and crossbeam member 23, the double beam configuration of crossbeam structure 19 is deemed more appropriate because of the enhanced structural strength characteristic of the dual beam support. In any case, for maximum load supporting capability for a given beam cross section, all of the cross-beam structures would be constructed in the manner described immediately hereinabove.

Crossbeam member 23 is comprised of first and second sections 49 and 51 of rectangular cross sections respectively. Crossbeam section 49 is mounted between spacer blocks 52 mounted between the upper and lower crossbeams 47 and 46 of crossbeam structures 21 and 19. Crossbeam section 51 is similarly mounted between crossbeam structures 19 and 22. It should be appreciated that spacers 52 could be removed and crossbeam member 23 could be a unitary piece fastened at its ends to, for example, the curved crossbeam of single beam configuration crossbeam structures 21 and 22.

The preferred manner of detachably mounting the structural components of the framework is best described with reference to FIGURES 2, and 4–6. Considering first FIGURE 6, there is shown the unique bracket 53 which lends itself to fastening all of the struts, crossbeams and horizontal support beams to one another. As can be seen, bracket 53 includes first and second parallelly extending sides 54 and 56 interconnected by web 57. A flange 58 integral with web 57 extends therefrom in a direction opposite sides 54 and 56. To enable bracket to fasten two pieces together, sides 54 and 56 each define two apertures 59, the apertures defined by one side aligned with those defined by the other. In addition, flange 58 defines an aperture 61.

Directing attention again to FIGURE 2, it is seen that the preferred manner of mounting the crossbeam structures to the struts incorporates the above described bracket whereby the framework can be easily and quickly assembled or disassembled. More specifically, a bracket 53 is mounted with its sides 54 and 56 straddling crossbeam 46 proximate its ends with bracket flange 58 lying against the surface of strut 26 facing inward away from sides 17 and 18 of box 12. The mounting of bracket 53 is accomplished by providing the end of crossbeam 46 with suitably spaced horizontal apertures between the sides thereof adjacent the bracket sides 54 and 56. Also by aligning the apertures 38 and 39, and the aperture 61 defined by bracket 53, a single wing nut 36 and bolt 37 can be used to fasten support beam 28, strut 26 and crossbeam structure 19 together. All of the crossbeams are similarly mounted to the struts of the trestle-like members 14 and 16.

The manner of mounting sections 49 and 51 of crossbeam member 23 between spacer blocks 52 is illustrated in FIGURES 4 and 5. As noted therein, a bracket 53 is secured at its flange 58 on each side of spacer 52 facing in a direction of another crossbeam structure. The ends of sections 49 and 51 are straddled by the sides 54 and 56 of bracket 53. The sides and flange of each bracket 53 is secured to spacers 52 and sections 49 and 51 with wing nuts and bolts in a manner similar to that described hereinbefore relative to the joining of the crossbeams and the struts.

The easy and rapid assembly and disassembly of the framework of the camper of the present invention is emphasized when it is noted that the fifteen separate members of the embodiment illustrated in FIGURE 1 may be connected or disconnected by manipulating only fifteen wing nuts. Furthermore, it is seen that all of the wing nuts are located in easily accessible positions.

Considering now the canvas covering 11, attention is again directed to FIGURES 1 and 3. In its flat extended configuration, covering 11 defines a cross-like configuration, with five rectangular segments which include a center segment with the other four segments respectively joined to a side of the center segment. The center segment is positioned on the framework to cover the top of the camper while the four integrally attached segments suspend therefrom to cover the front, back and sides of the camper respectively. It is to be realized, of course, that the edges of adjacent segments can be sewn together so that the covering is adapted to fit over the framework.

In attaching the covering 11 to the framework, an extension of the ends of sides of covering 11 is arranged to define sleeve 62. Horizontal support beams 29 are inserted into respective sleeves 62 which together are placed in notches 33 and fastened by the wing nut 36 and bolt 37 to the struts. By this manner of attaching the sides of covering 11 to the framework of the camper, an extremely tight fit along the sides of box 12 is obtainable with a minimum of strain imparted to covering 11. A sealed enclosure is completed by adapting the adjacent edges of the sides, front and rear segments of covering 11 with zippers 63 and buttons 64.

Generally it is desirable to have windows in a camper to facilitate lighting the interior as well as viewing into and out of the camper. In the camper of the present invention, a light pervious material, such as glass or celluloid, may be mounted, for example, into the front and rear segments of covering 11 to serve as windows 66 and 67 respectively.

As emphasized previously, the tauter that covering 11 can be maintained the more desirable it is from the standpoint of reduced wind induced buffeting. Referring now to FIGURES 2 and 3, a plurality of eyelets 68 are secured to covering 11, usually only along the side segments thereof. Associated with each eyelet is a spring 69 mounted in tension between the eyelet 68 and the side of the box. The action of the springs 69 keep the covering tight against the crossbeams 48 thereby minimizing the tendency of the covering to buffet when encountering wind.

What is claimed is:

1. A portable camper fastened to an open topped box of a pickup truck to provide a sheltered enclosure, the combination comprising with said box a framework of generally U-shaped cross section comprised of separable parts detachably mounted to said box including first and second pairs of spaced apart struts detachably vertically mounted respectively to first and second opposite sides of said box in a rectangular configuration, first and second crossbeams and first and second horizontal support beams each one of which is horizontally detachably mounted individually between one pair of adjacent struts at the terminal ends thereof distal said box, a fabric covering having five rectangular segments integrally joined in a cross-like configuration having a center segment and a segment extending from each side thereof, said covering detachably mounted to said framework with its rectangular center segment disposed to cover the area defined by the crossbeams and horizontal support beams and said rectangular segments extending therefrom arranged to cover the areas defined between said struts, closure means joining adjacent edges of rectangular segments extending from said center segment, a plurality of eyelets fastened to the rectangular segments of said covering extending from said center segment thereof, a spring associated with each eyelet, each spring mounted under tension between said eyelet associated therewith and said box, at least first and second fabric extensions secured respectively to the terminal ends of first and second opposite rectangular segments of said covering to define respectively first and second sleeves which extend the length of said rectangular segments, and third and fourth horizontal support beams inserted respectively into said first and second sleeves, said third and fourth horizontal support beams being detachably secured to said framework.

2. The portable camper as recited in claim 1 further defined by said crossbeams bending concavely away from the box of said truck.

3. A portable camper for mounting on an open topped box of a pickup truck to define a sheltered enclosure therewith comprising a frame of separable parts including first and second trestle-like support members adapted to be detachably mounted vertically to said box of said truck at spaced opposite locations each comprising first and second horizontal support beams with said second support beams being vertically spaced above said first support beams and at least two struts each of which is detachably fixed at its respective ends to said first and second horizontal support beams, first and second horizontal crossbeams detachably mounted respectively between opposite adjacent ends of said first and second trestle-like members proximate said second horizontal support beams to define with said second horizontal beams an upper plane of said frame, a third crossbeam detachably horizontally mounted between said first and second horizontal crossbeams, a crossbeam structure detachably mounted between the second horizontal support beams of said trestle-like support member and intersecting said third crossbeam, said crossbeam structure including a fourth crossbeam and a fifth crossbeam mounted vertically spaced above said fourth crossbeam and bending concavely away therefrom, and a fabric covering detachably mounted to said frame in covering relationship thereto to provide said sheltered enclosure.

4. The camper frame as recited in claim 3 further defined by said third crossbeam having first and second tandem half sections whose facing ends are mounted to a spacer mounted between said fourth and fifth crossbeams in the space defined thereby.

5. A frame for mounting a fabric covering over an open topped rectangular box of a pickup truck to define a sheltered enclosure therewith comprising first and second trestle-like support members adapted to be detachably mounted vertically to said box of said truck at opposite sides thereof each comprising first and second horizontal support beams of generally rectangular cross section, a first strut flanked by second and third struts all of rectangular cross section and equally spaced apart, first adjacent ends of said struts adapted to be detachably mounted to the side walls of said box of said truck and support said struts in a vertical position, the space between the second and third struts of each trestle-like member approximately equal to the length of the sides of said box, said struts rectangularly notched proximate their respective ends along the surface facing outward away from the side of said box to receive respectively one of said horizontal support beams therein, said horizontal support beams having apertures axially aligned with apertures through the notched portion of said struts, a first crossbeam structure including a first crossbeam of generally rectangular cross section detachably mounted between the first struts of said trestle-like members proximate the horizontal support beam distal said box and a second crossbeam of generally rectangular cross section detachably mounted between said first struts proximate and vertically spaced above said first crossbeam and bending concavely away therefrom and defining a space therebetween, a spacer mounted in the space defined by said first and second crossbeams at their midpoints, a second crossbeam structure detachably mounted between the second struts of said trestle-like members approximate the horizontal support beam distal said box, a third crossbeam structure detachably mounted between the third struts of said trestle-like members proximate the horizontal support beam distal said box, a third crossbeam of generally rectangular cross section detachably mounted between said spacer and said second crossbeam structure, and a fourth crossbeam of generally rectangular cross section detachably mounted between the side of said spacer distal said fourth crossbeam and said third crossbeam structure.

6. The camper frame as recited in claim 5 further defined by said horizontal support beams and crossbeams being mounted to said struts and spacer by U-shaped brackets each defining first and second parallel extending sides with an interconnecting web and having a flange integral with said sides and extending away therefrom in a direction opposite said sides, said sides each having two apertures aligned with the apertures of the opposite side, said flange having an aperture therethrough, said brackets mounted to have their respective sides straddle said horizontal support beams and crossbeams respectively with their respective flange portion abutting said struts and spacer respectively.

7. A portable camper adapted to be fastened to a rectangular open topped box of a pickup truck to define therewith sheltered living quarters, said box having front, rear and side walls, the combination comprising, six struts of rectangular cross section detachably vertically mounted to said box, one strut disposed at each corner of the rectangular box and at the midpoint of the sidewalls, said struts rectangularly notched proximate their respective ends along the surface facing outward away from the sidewalls of said box, first and second horizontal support beams of rectangular cross section positioned respectively within respective notches proximate opposite ends of said struts, said beams each having a row of three apertures with each aperture of said row axially aligned with an aperture through the notched portion of each of said struts distal said box for receiving therethrough nut and bolt means to fasten said support beams to said struts, first, second and third crossbeam structures each detachably mounted respectively between said first and second horizontal support beams at strut locations and each comprising a first crossbeam of rectangular cross section mounted between first and second adjacent struts mounted to opposite sidewalls of said box, said crossbeam having proximate each of its ends two horizontally spaced apertures horizontally extending through its width, and a second crossbeam of rectangular cross section mounted between said horizontal support beams vertically spaced above said first crossbeam and bending concavely away therefrom and defining a space therebetween, said second crossbeam having proximate its ends two horizontally spaced apertures horizontally extending through its width, and a spacer mounted in the space defined by said first and second crossbeams at their midpoints, said spacer having an aperture extending therethrough in a direction perpendicular to said crossbeams, third and fourth crossbeams of rectangular cross section, said third crossbeam mounted between the spacers of said first and second crossbeam structures respectively, said fourth crossbeam mounted between the spacers of said second and third crossbeam structures respectively, each end of the third and fourth crossbeams having two horizontally spaced apertures extending horizontally therethrough, U-shaped brackets each defining first and second parallel extending sides with an interconnecting web and having a flange integral with said web extending away therefrom in a direction opposite said sides, said sides each having two horizontally spaced apertures aligned with the apertures of the opposite sides, said flange having an aperture therethrough, one of said U-shaped brackets mounted at each end of said crossbeams with its sides straddling said crossbeam to have its side apertures in alignment with those of said crossbeam and its flange aperture in alignment with respective strut, horizontal support beam and spacer apertures, a canvas covering disposed to envelop said crossbeams, struts and support beams to thereby define an enclosure having a top and front, rear and side walls, a first and second window mounted respectively in said front and rear walls of said canvas covering, a plurality of eyelets secured to said canvas walls, a spring associated with each eyelet, each spring mounted under tension between said eyelet associated therewith and said box, first and second canvas extensions secured respectively to the terminal ends of opposite canvas side walls to define respectively first and second sleeves which extend the length of said side walls, and rods of rectangular cross section inserted within said sleeves and positioned within the notches defined by said struts proximate said box of said truck and secured therein by nut and bolt means.

References Cited
UNITED STATES PATENTS

| | | | |
|---|---|---|---|
| 2,345,377 | 3/1944 | Bowen | 135—1 |
| 2,510,365 | 6/1950 | Barnett et al. | 135—7.1 X |
| 2,869,561 | 1/1959 | Harkness | 135—1 |
| 3,009,212 | 11/1961 | Makens | 296—102 X |

DAVID J. WILLIAMOWSKY, *Primary Examiner.*

P. M. CAUM, *Assistant Examiner.*